(12) United States Patent
Ashikhmin et al.

(10) Patent No.: US 9,072,058 B2
(45) Date of Patent: Jun. 30, 2015

(54) METHOD AND APPARATUS FOR POWER OPTIMIZATION IN WIRELESS SYSTEMS WITH LARGE ANTENNA ARRAYS

(75) Inventors: Alexei Ashikhmin, Morristown, NJ (US); Thomas L. Marzetta, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/402,204

(22) Filed: Feb. 22, 2012

(65) Prior Publication Data

US 2013/0201908 A1    Aug. 8, 2013

Related U.S. Application Data

(60) Provisional application No. 61/595,284, filed on Feb. 6, 2012.

(51) Int. Cl.
*H04W 52/24*     (2009.01)
*H04W 52/42*     (2009.01)
*H04B 7/06*      (2006.01)

(52) U.S. Cl.
CPC ............ *H04W 52/241* (2013.01); *H04W 52/42* (2013.01); *H04B 7/0626* (2013.01)

(58) Field of Classification Search
None
See application file for complete search history.

(56) References Cited

U.S. PATENT DOCUMENTS

| 6,456,608 | B1 * | 9/2002 | Lomp | 370/335 |
|---|---|---|---|---|
| 2007/0218950 | A1 * | 9/2007 | Codreanu et al. | 455/562.1 |
| 2012/0287867 | A1 * | 11/2012 | Sambhwani et al. | 370/329 |
| 2013/0084908 | A1 * | 4/2013 | Joo | 455/509 |
| 2013/0156021 | A1 * | 6/2013 | Ashikhmin et al. | 370/338 |
| 2013/0188567 | A1 * | 7/2013 | Wang et al. | 370/329 |

OTHER PUBLICATIONS

F. Fernandes, A. Ashikhmin, and T. Marzetta, "Interference Reduction on Cellular Networks with Large Antenna Arrays," accepted for presentation at the IEEE International Conference on Communications, IEEE ICC 2012, Jun. 10-15, 2012, Ottawa, Canada, to be published in the conference proceedings.

M. Rasti and A. R. Sharafat, "Distributed Uplink Power Control with Soft Removal for Wireless Networks," IEEE Transactions on Communications, vol. 59, No. 3, (Mar. 2011), pp. 833-843.

F. Berggren, R. Jantti, and S.-L. Kim, "A Generalized Algorithm for Constrained Power Control With Capability of Temporary Removal, "IEEE Transactions on Vehicular Technology, vol. 50, No. 6, (Nov. 2011), pp. 1604-1612.

(Continued)

*Primary Examiner* — Ian N Moore
*Assistant Examiner* — Latresa McCallum
(74) *Attorney, Agent, or Firm* — Chiesa Shahinian & Giantomasi PC

(57) ABSTRACT

A method and apparatus for communication between a wireless base station and a population of one or more terminals are provided, involving, in each of a plurality of iterations, transmitting a block of forward-link data from an array of multiple base station antennas to the terminal population. In each iteration, a forward-link power level is updated for each said terminal using a distributed algorithm and purely local information. Meanwhile, a set of beamforming coefficients based on channel state information (CSI) obtained from reverse-link pilot signals is periodically updated, and each data block is precoded with the most recently updated beamforming coefficients. Each data block is transmitted at the most recently updated forward-link power levels.

15 Claims, 10 Drawing Sheets

(56) References Cited

OTHER PUBLICATIONS

K.-K. Leung and C.~W. Sung, "An Opportunistic Power Control Algorithm for Cellular Network," IEEE/ACM Transactions on Networking, vol. 14, No. 3 (Jun. 2006), pp. 470-478.

T. L. Marzetta, "Noncooperative Cellular Wireless with Unlimited Numbers of Base Station Antennas," IEEE Transactions on Wireless Communications, vol. 9, No. 11, (Nov. 2010) pp. 3590-3600.

A. Ashikhmin, et al.; U.S. Appl. No. 13/329,834, "Large-Scale Antenna Method and Apparatus of Wireless Communication With Suppression of Intercell Interference," filed Dec. 19, 2011.

* cited by examiner

METHOD AND APPARATUS FOR POWER OPTIMIZATION IN WIRELESS SYSTEMS WITH LARGE ANTENNA ARRAYS

CROSS-REFERENCE TO RELATED APPLICATION

This application claims priority of Provisional Application Ser. No. 61/595,284 which was filed on Feb. 6, 2012.

FIELD OF THE INVENTION

The invention relates to methods and systems of wireless communication that use multiple antennas to achieve improved network performance.

ART BACKGROUND

It has long been known that techniques of spatial multiplexing can be used to improve the spectral efficiency of wireless networks. (Spectral efficiency describes the transmitted data rate per unit of frequency, typically in bits per second per Hz.) In typical examples of spatial multiplexing, a multiple array of transmit antennas sends a superposition of messages to a multiple array of receive antennas. The channel state information (CSI), i.e. the channel coefficients between the respective transmit-receive antenna pairs, is assumed known. Provided that there is low correlation among the respective channel coefficients, the CSI can be used by the transmitter, or the receiver, or both, to define a quasi-independent channel for each of the transmitted messages. As a consequence, the individual messages are recoverable at the receiving antenna array.

More recently, experts have proposed extensions of the spatial multiplexing technique, in which a multiplicity of mobile or stationary user terminals (referred to herein as "terminals") are served simultaneously in the same time-frequency slots by an even larger number of base station antennas or the like, which we refer to herein as "service antennas", or simply as "antennas". Particularly when the number of service antennas is much greater than the number of terminals, such networks may be referred to as "Large-Scale Antenna Systems (LSAS)".

Theoretical studies predict that the performance of LSAS networks scales favorably with increasing numbers of service antennas. In particular, there are gains not only in the spectral efficiency, but also in the energy efficiency. (The energy efficiency describes the ratio of total data throughput to total transmitted power, and is measured, e.g., in bits per Joule.)

One such study, referred to below as Fernandes 2012, is F. Fernandes, A. Ashikhmin, and T. Marzetta, "Interference Reduction on Cellular Networks with Large Antenna Arrays," which has been accepted for presentation at the IEEE International Conference on Communications, IEEE ICC 2012, Jun. 10-15, 2012, Ottawa, Canada, and which is to be published in the conference proceedings. Another such study, referred to below as Marzetta 2010, is T. L. Marzetta, "Non-cooperative Cellular Wireless with Unlimited Numbers of Base Station Antennas," *IEEE Trans. on Wireless Comm* 9 (November 2010) 3590-3600.

In some approaches, the base stations may obtain CSI through a procedure that relies on time-division duplex (TDD) reciprocity. That is, terminals send pilot sequences on the reverse link, from which the base stations can estimate the CSI. The base stations can then use the CSI for beam forming. This approach works well when each terminal can be assigned one of a set of mutually orthogonal pilot sequences.

Generally, it is considered advantageous for the mobiles to synchronously transmit all pilot sequences on a given frequency, and possibly even on all frequencies, making use of the mutual orthogonality of the pilot sequences.

The number of available orthogonal pilot sequences, however, is relatively small, and can be no more than the ratio of the coherence time to the delay spread. Terminals within a single cell can use orthogonal pilot sequences, but terminals from the neighboring cells will typically be required to reuse at least some of the same pilot sequences. This reuse of pilot sequences in different cells creates a problem of pilot contamination. The pilot contamination causes a base station to beam-form its message-bearing signals not only to the terminals located in the same cell, but also to terminals located in the neighboring cells. This is referred to as directed interference. A method for mitigating directed interference in LSAS networks is described in the co-pending U.S. patent application Ser. No. 13/329,834, filed on Dec. 19, 2011 by A. Ashikhmin and T. Marzetta under the title, "Large-Scale Antenna Method and Apparatus of Wireless Communication with Suppression of Intercell Interference," and assigned to the assignee hereof.

Another source of interference on the forward link is suboptimal allocation of transmit power from a base station to the respective terminals that it serves. That is, a base station transmitting to a particular terminal in its own cell may interfere with a neighboring base stations's transmission to a corresponding terminal in the neighboring cell. An optimal allocation of transmit power on the forward link would minimize such interference, subject to the requirement that received signal-to-noise-and-interference ratio (SINR) must be adequate at each of the served terminals.

SUMMARY OF THE INVENTION

One technique for approaching an optimal allocation of forward-link transmit power is to use a distributed power-allocation algorithm. In a distributed algorithm, each base station in the network is able to base its adjustments of transmit power, in each of multiple iteration, on purely local information. That is, it is sufficient to use feedback that the base station receives from its own served terminals, without reliance on data communicated from other base stations or from the core network.

Although they are advantageous in some respects, distributed algorithms have been disfavored for forward-link power allocation in mobile networks. The reason is that such algorithms typically converge only after many iterations. In a mobile network, the adaptation time, i.e., the time required for the algorithm to converge to static CSI, may in fact exceed the time interval over which the CSI can reasonably be treated as static. As a consequence, the algorithm may be too slow to track the evolution of the propagation channel, and for that reason may fail to converge.

However, we have made the surprising discovery that in an LSAS network, it is feasible to employ a distributed algorithm for forward-link power allocation, even if the terminals of the network are mobile at normal vehicular speeds or even greater speeds.

Our discovery relies on a factoring of the fading coefficients (also referred to here as "channel" or "propagation" coefficients) into two components: a fast fading coefficient and a slow fading coefficient (which is also often referred to as a "shadow fading" coefficient). The fading behavior responsible for the slow-fading coefficients changes very slowly compared with fast fading. Slow fading is only weakly dependent on frequency, and the slow-fading coefficients are substantially equal for all of the antennas comprising a particular base station array.

We found that due to averaging over the antenna arrays, the feedback information essential to the distributed algorithm depends, in the limit as the number of antennas per array grows without bound, only on the slow-fading coefficients. As a consequence, convergence is possible even when the terminals are moving at high vehicular speeds.

Accordingly, the invention in an embodiment is a method of communication between a wireless base station and a population of one or more terminals, comprising, in each of a plurality of iterations:

transmitting a block of forward-link data from an array of multiple base station antennas to the terminal population, and updating a forward-link power level for each said terminal based on SINR feedback data returned by the terminal population in response to the forward-link data transmitted in the previous iteration.

The method includes, during the plurality of iterations, periodically updating a set of beamforming coefficients based on channel state information (CSI) obtained from reverse-link pilot signals, and precoding each data block prior to transmission with the most recently updated beamforming coefficients.

It is a further feature of the method that each data block is transmitted at the most recently updated forward-link power levels, and the power levels are updated using purely local information.

In another embodiment, the invention is a base station comprising modules configured to perform each of the process steps described above.

DETAILED DESCRIPTION

Figure 1:
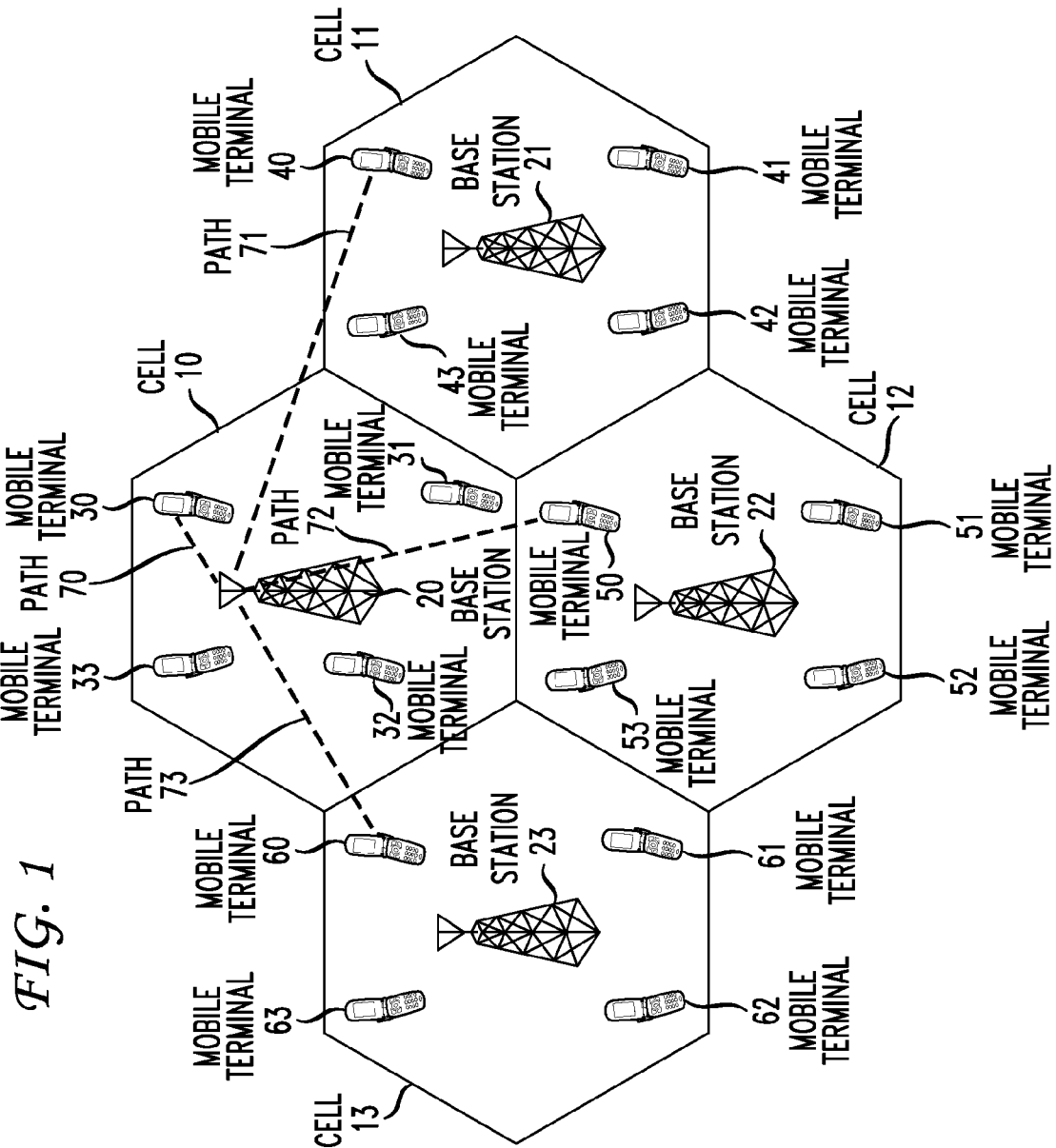
FIG. 1 is a schematic drawing of a portion of an LSAS network, illustrating intercell interference due to pilot contamination.

In the following discussion, the term "message" means the whole or any portion of a body of data to be transmitted. A message may be encoded in the form of one or more symbols, each symbol having an information content of one or more binary bits. The term "module" means any specialized circuit or combination of circuits, or any set of instructions recorded in a machine-readable memory, together with general-purpose or special-purpose circuitry capable of carrying out the recorded instructions.

A message-carrying signal transmitted from a base station antenna array during one channel use interval is referred to here as a "symbol". A symbol is distributed in space and frequency, because each base station has multiple antennas for transmission, and because each symbol will typically be distributed over multiple OFDM subcarriers or "tones".

The term "antenna" refers to a base station antenna associated with a cell. Each cell has at most M antennas. The term "terminal" refers to a mobile user terminal.

The total number of cells is L. Each cell contains at most K terminals. The total number of pilot signals is K. The pilot signals are numbered 1, ..., K. The pilot signals are assumed to be allocated to terminals such that in each cell, the k-th terminal is allocated pilot signal k.

Antenna mj is the m-th antenna of cell j. Terminal kl is the k-th terminal of cell l.

For tone n, the channel coefficient between antenna mj and terminal kl is $g_{nmjkl}$. Hereinafter, the tone index n will be suppressed from our notation. An M×K channel matrix $G_{jl}$ is defined between the base station of cell j and the terminals of cell l by:

$$[G_{jl}]_{m_1k_1} = g_{nmjkl}; \quad m = m_1, k = k_1. \quad (1)$$

The channel coefficient g may be factored into a fast fading factor h and a slow fading factor $\beta^{1/2}$:

$$g_{nmjkl} = h_{nmjkl} \cdot \beta_{jl}^{1/2}. \quad (2)$$

Suppressing n, we can define a vector $h_{jkl} = (h_{1jkl}, h_{2jkl}, \ldots, h_{Mjkl})$ which represents the fast-fading coefficients (also referred to here as the "h" coefficients) over the M antennas of cell j.

The h coefficients, which represent fast fading, can change with as little as ¼ wavelength of motion. On the other hand, the fading behavior represented by the β coefficients is slowly varying. Although the β coefficients (i.e., the slow-fading coefficients) are often referred to as "shadow" fading coefficients, this fading is typically a combination of geometric attenuation and shadow fading. Typically, it is constant over frequency and slowly varying over space and time. By contrast, fast fading typically changes rapidly over space and time. In frequency, fast fading varies over frequency intervals that are the reciprocal of the channel delay spread. Without loss of generality in our mathematical analysis below, we can make the convenient assumption that the h coefficients have unit variance. (We have the freedom to do so because the multiplicative decomposition of g is non-unique).

It will be seen that the slow-fading coefficient in Equation (2) has been indexed for the base station of cell j and the k-th terminal of cell l. It has not been indexed for an individual antenna of the base station of cell j because these coefficients are assumed quasi-independent of spatial location, at least on the spatial scale of an antenna array.

FIG. 1 shows a portion of a cellular network, including cells 10-13, having respective base stations 20-23. A plurality of mobile terminals is shown in each cell, respectively labeled 30-33, 40-43, 50-53, and 60-63. To simplify the drawing, each of the base stations is treated as having only a single antenna.

In forward-link transmission, base station 20, for example, transmits a message to terminal 30 on path 70. If terminals 40, 50, and 60 have been assigned the same pilot signal as terminal 30, pilot contamination may cause the transmitted message to interfere on paths 71, 72, and 73 to terminals 40, 50, and 60, respectively.

Conversely, in reverse-link transmission, terminal 30 transmits a message to base station 20 on path 70. (For purposes of this illustration, we are treating paths 70-73 as bidirectional.) Pilot contamination may cause the reverse-link messages on paths 71-73 to interfere, at base station 20, with the reverse-link message transmitted from terminal 30 on path 70.

Figure 2:
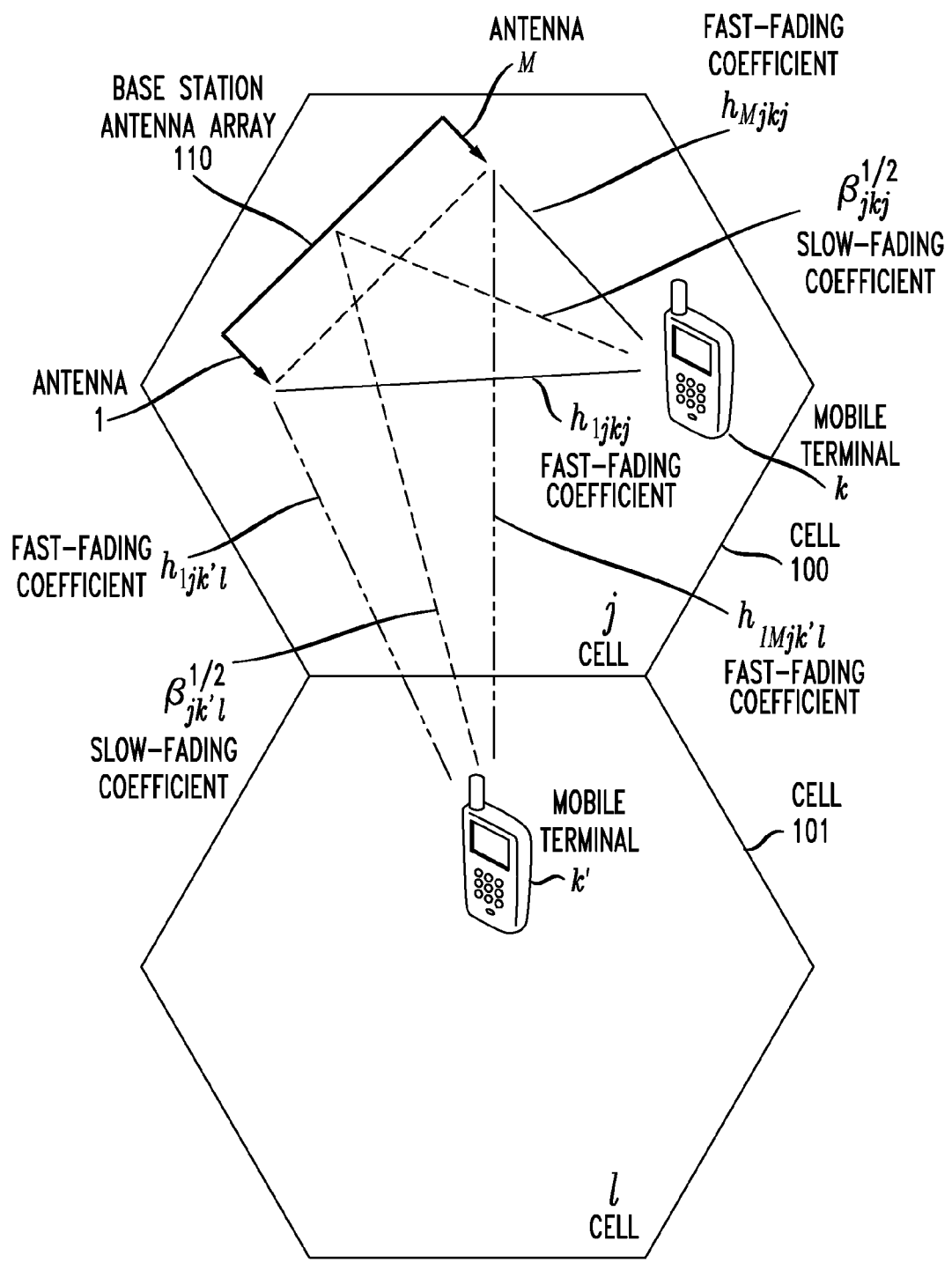
FIG. 2 is a schematic drawing of a portion of an LSAS network, illustrating a distinction between fast-fading coefficients and slow-fading coefficients.

FIG. 2 shows a portion of a cellular network, including cells 100 and 101. To illustrate what is meant by fast-fading and slow-fading coefficients, we have included, in the figure, base station antenna array 110 of cell 100, mobile terminal k of cell 100, and mobile terminal k' of cell 101. To simplify the figure, all other features of the cells have been omitted. As indicated in the figure, cell 100 is cell j for purposes of this illustration, and cell 101 is cell l. Antenna array 110 includes M antennas, of which antenna 1 and antenna M have been explicitly shown. Although antenna array 110 has been drawn for convenience as a linear array, it should be noted that there is no requirement for the geographical distribution of antennas to take a linear shape, or any other particular shape. Likewise, the scale of the linear antenna array has been drawn, solely for convenience, as comparable to the size of the cell. There is no limitation on the geographical scale of the antenna array, except that it will generally be advantageous to space the antennas apart by at least one-half wavelength to minimize the electromagnetic coupling between antennas.

Turning to the figure, it will be seen that propagation paths from antenna 1 to terminal k, antenna 1 to terminal k', antenna M to terminal k, and antenna M to terminal k' have been respectively labeled with the fast-fading coefficients $h_{1jkj}$, $h_{1jk1}$, $h_{Mjkj}$, and $h_{Mjk1}$. Two slow-fading coefficients have also been indicated in the figure. They are $\beta_{jkj}^{1/2}$ from antenna array 110 to terminal k of cell j, and $\beta_{jk1}^{1/2}$ from antenna array 110 to terminal k' of cell l. Other fast-fading coefficients from intermediate antennas of array 110 to the respective terminals are indicated only by broken lines in the figure.

We assume in the following discussion that OFDM signal modulation is used for both forward link and reverse link signals. It should be understood, however, that the invention is not limited to OFDM, but may be implemented using other modulation techniques such as time-reversal modulation or CDMA modulation.

The number M of antennas per base station may take any value within a wide range. However, fewer than 20 antennas will probably be insufficient to realize the benefits of signal averaging than will be described below. On the other hand, more than 1000 antennas, although advantageous for optimizing performance, will probably be impractical due to limitations of space and cost.

We will now briefly describe a beam-forming approach for forward-link transmission, similar to the approaches described in Marzetta 2010 and Fernandes 2012. As explained there, for forward-link transmissions, each cell transmits an M×1 vector, obtained by applying an M×K precoding matrix to a K×1 vector whose entries are the symbols destined for respective terminals served by that cell. The precoding matrix discussed in Marzetta 2010 and Fernandes 2012 is the conjugate of the estimated channel matrix within a given cell between the base station antennas and the terminals served by that cell. Thus, the l-th base station transmits $\hat{G}_{ll}^* a(l)$, where the first term is the precoding matrix and the second term is the K×1 vector of symbols to be transmitted. The precoding matrix is the M×K matrix given by:

$$[\hat{G}_{ll}^*]_{m_1 k_1} = \hat{g}_{nmjkl}^*; \quad m = m_1, k = k_1, j = l, \quad (3)$$

where for each (n, m, j, k, l), each entry $\hat{g}_{nmjkl}^*$ is the complex conjugate of an estimate of the $g_{nmjkl}$ given above.

Figure 3:
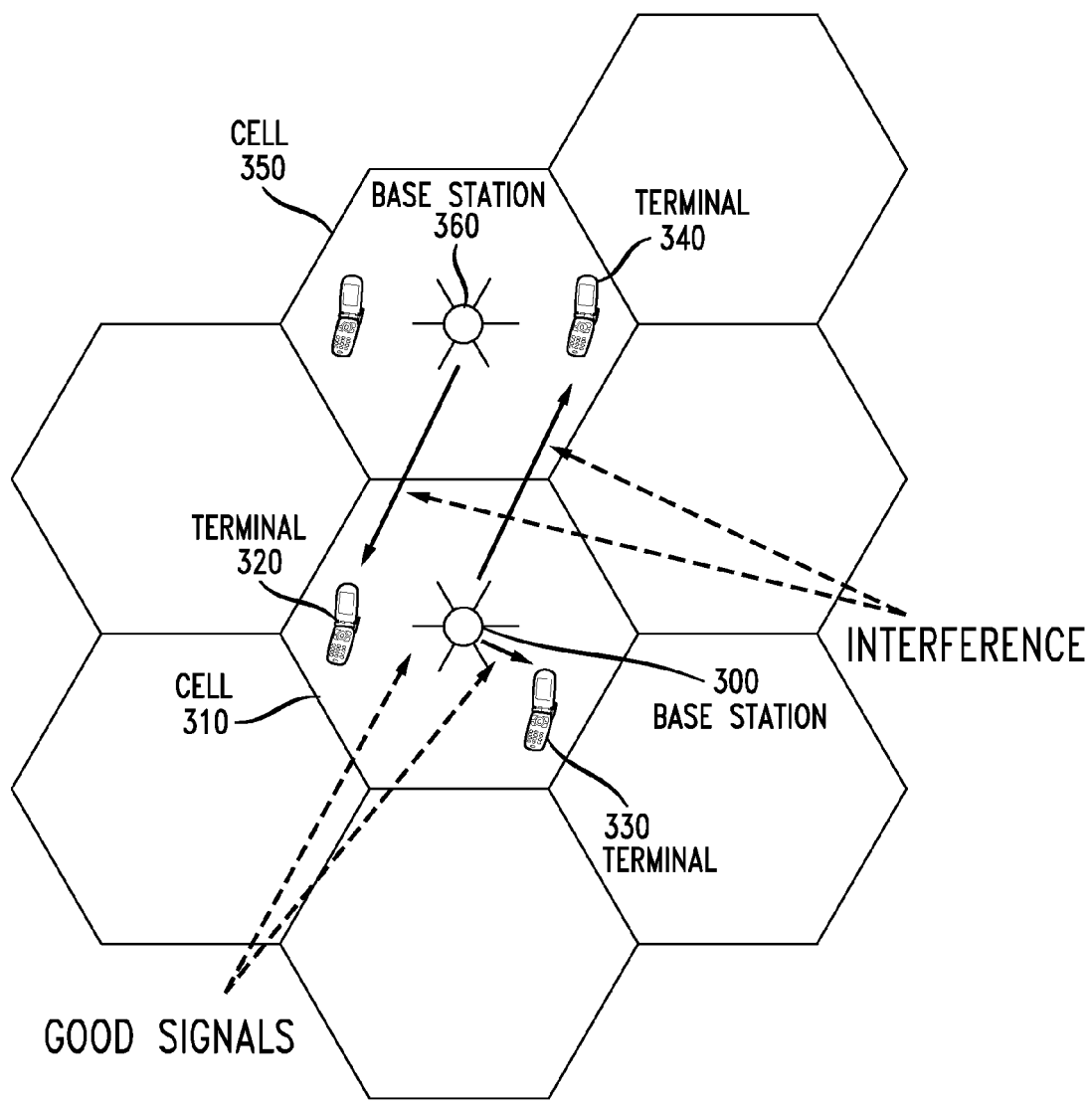
FIG. 3 is a schematic representation of directed interference due to pilot contamination.

The process of estimating the channel matrix is contaminated by pilots from other cells. That is, each measurement of a channel coefficient between a given antenna and a terminal k contains additive contributions due to the channel coefficients between the given antenna and the k-th terminals of other cells. As a consequence, the entries in the matrix estimate $\hat{G}_{jj}^*$ will contain pilot contamination which, as noted above, leads to directed interference. Directed interference is illustrated in FIG. 3, where it will be seen, for example, that base station 300 of cell 310 is transmitting messages to its served terminals 320 and 330. Meanwhile, the same base station 300 is transmitting an interfering signal to terminal 340 of cell 350, while conversely, base station 360 of cell 350 is transmitting an interfering signal to terminal 320.

We will now discuss an alternative formulation of the precoding matrix, which takes explicit account of the forward-link transmit powers. For the l-th cell and the k-th terminal in the l-th cell, we define a beamforming vector $w_{lkl}$ by $$w_{lkl} = \frac{\hat{g}_{lkl}^*}{\|\hat{g}_{lkl}^*\|} = \frac{\beta_{lkl}^{\frac{1}{2}} \hat{h}_{lkl}^*}{\beta_{lkl}^{\frac{1}{2}} \|\hat{h}_{lkl}^*\|} = \frac{\hat{h}_{lkl}^*}{\|\hat{h}_{lkl}^*\|}, \quad (4)$$

where $\hat{g}_{lkl}^*$ is the vector of complex conjugates of estimated coefficients $\hat{g}_{nmjkl}^*$, taken over the M antennas of cell l, and $\hat{g}_{lkl}^* = \beta_{lkl}^{1/2} \hat{h}_{lkl}^*$. It will thus be understood that $\hat{g}_{lkl}^*$ is an M×1 column vector, and that it is equivalent to the k-th column of the matrix $\hat{G}_{ll}^*$.

We now define $P_{kl}$ as the total forward-link transmit power from base station l to the k-th user in cell l, and we define $s_{kl}$ as the signal (i.e., a scalar complex-valued message element) to be transmitted to the k-th user. The l-th base station precodes and combines the K signals destined for the K respective terminals of cell l to form the composite transmit vector $\omega_l$ given by:

$$\omega_l = \sqrt{P_{1l}} w_{l1l} s_{1l} + \sqrt{P_{2l}} w_{l2l} s_{2l} + \ldots + \sqrt{P_{Kl}} w_{lKl} s_{Kl}. \quad (5)$$

Accordingly, it will be understood that a signal vector $S_l$ defined by $$S_l = \begin{pmatrix} s_{1l} \\ s_{2l} \\ \vdots \\ s_{Kl} \end{pmatrix}$$

is precoded by the product $W(l) P_{diag}^{1/2}(l)$, where the K×K diagonal matrix $P_{diag}^{1/2}(l)$ and the M×K matrix $W(l)$ are respectively defined by:

$$P_{diag}^{\frac{1}{2}}(l) = \begin{pmatrix} \sqrt{P_{1l}} & 0 & \ldots & 0 \\ 0 & \sqrt{P_{2l}} & \ldots & 0 \\ & & \ddots & \\ 0 & 0 & \ldots & \sqrt{P_{Kl}} \end{pmatrix};$$

$$W(l) = (w_{l1l}, w_{l2l}, \ldots, w_{lKl}).$$

Thus, the composite transmit vector $\omega_l$ may be expressed in terms of the precoding matrix and the signal vector by:

$$\omega_l = W(l) P_{diag}^{1/2}(l) S_l. \quad (6)$$

All of the base stations transmit synchronously. Base station/transmits the m-th component of the vector $\omega_l$ from the m-th antenna of the base station.

Each terminal receives a sum of the synchronous transmissions from all of the base stations, including the combined effects of the precoding matrix and the physical propagation channel.

Thus, the k-th mobile in the l-th cell receives the following signal $$x_{kl} = \sqrt{\beta_{lkl}} \, h_{lkl} \cdot \omega_l + \sum_{q \neq l, q=1}^{L} \sqrt{\beta_{qkl}} \, h_{qkl} \cdot \omega_q + z \quad (7)$$

$$= \sqrt{\beta_{lkl}} \, h_{lkl} \cdot \sqrt{P_{kl}} \, w_{lkl} s_{kl} + \sum_{j \neq k, j=1}^{K} \sqrt{\beta_{lkl}} \, h_{lkl} \cdot \sqrt{P_{jl}} \, w_{ljl} s_{jl} +$$

$$\sum_{q \neq l, q=1}^{L} \sum_{j=1}^{K} \sqrt{\beta_{qkl}} \, h_{qkl} \cdot \sqrt{P_{jq}} \, w_{qjq} s_{jq} + z.$$

The first term in the above expression (after the second equal sign) is the useful signal, the second and third terms are interference, and z is additive noise. The vector multiplication symbol "·" in the above expression indicates an unconjugated inner product of vectors.

Accordingly, it will be understood that the power of the useful signal is $\beta_{lkl} P_{kl} \|h_{lkl} \cdot w_{lkl}\|^2$ and the powers of the respective interference terms are $\beta_{lkl} P_{jl} \|h_{lkl} \cdot w_{ljl}\|^2$ and $\beta_{qkl} P_{jq} \|h_{qkl} \cdot w_{qjq}\|^2$.

In accordance with the present invention, the transmit powers $P_{kl}$, k=1,..., K; l=1,..., L are optimized jointly over cells and over the respective terminals within each cell, so as to maximize some figure of merit for the SINR over all of the terminals in all of the cooperating cells so that, e.g., a relatively high SINR will be achieved for most of the affected terminals.

There are various well-known methods for power optimization in wireless communication systems. We will now describe, by way of example, a generic, distributed algorithm for power optimization. The algorithm is "distributed" because there is no sharing of data between base stations. Instead, each base station makes power allocations using only measurements from within its own cell.

For simplicity, we assume first that each cell j contains only one terminal, which we refer to as "terminal j". Accordingly, the path gain between the base station and the terminal within a given cell j is denoted $g_{jj}$, and the path gain between a (possibly interfering) base station i and terminal j is denoted $g_{ij}$. The forward-link transmit power at time t from base station j to its served terminal j is denoted $P_j(t)$.

At time t, the power of the useful signal received by terminal j is $$P_{j,signal}(t) = g_{jj}^2 P_j(t), \quad (8)$$

and the power of the interference is $$P_{j,interf}(t) = \sum_{i \neq j} g_{ij}^2 P_i(t). \quad (9)$$

We denote by $S_{j,target}$ the target SINR that is desired for terminal j.

Distributed Transmit Power Optimization Algorithm (Generic)

Assume: Each cell j contains one base station (base station j) and one terminal (terminal j).

For each cell j:
1. Terminal j estimates $P_{j,signal}(t)$ and $P_{j,interf}(t)$ and transmits SINR information derived from these estimates to its serving base station j.
2. The serving base station j sets up new transmit power $P_j(t+1) = f(P_{j,signal}(t), P_{j,intefer}(t), S_j)$, where $f(\cdot)$ denotes an appropriate function, as discussed below.
3. The serving base station j transmits with the power $P_j(t+1)$.
4. Repeat steps 1-3 until converged or until a limiting count is reached.
End.

The above algorithm is readily generalized to the case in which each cell contains multiple terminals. In the general case, the preceding expression for $P_{j,interf}(t)$ will include multiple interference signals from the multiple interfering terminals in each cell. It should be noted that at each terminal, interference is not simply inferred from Equation (9), but rather, it is measured directly, using pilot signals or data signals received from the serving base station. Conversely, each base station uses the SINR information derived from the values of $P_{j,signal}(t)$ and $P_{j,interf}(t)$ that it receives from each of its served terminals to determine the next transmit power. SINR information that may be useful in this regard may take any of various possible forms, including without limitation actual or quantized values of $P_{j,signal}(t)$ and $P_{j,interf}(t)$, the ratio $P_{j,signal}(t)/P_{j,interf}(t)$, or any of various indicators of SINR known to those skilled in the art.

The function $f(\cdot)$ can be chosen differently in different algorithms and for different applications. The j-th base station can make decisions about the next transmit power $P_j(t+1)$ based on purely local information; i.e., based only on parameters obtained within its own cell, e.g., $P_{j,signal}(t)$, $P_{j,intefer}(t)$, $S_j$, and not on parameters obtained from other base stations or from the core network. As noted above, this is characteristic of a distributed algorithm.

Algorithms of the exemplary kind typically require many iterations to converge to a good set of transmit powers $P_1$, $P_2$, ..., $P_K$. For example, in simulations that we have performed using parameters that would be typical of commercial OFDM networks, such algorithms have typically required 60-70 iterations to converge. In practice, this would typically require a time interval equivalent to several hundred OFDM symbols.

Convergence is possible, however, only if the path gains $g_{ji}$ remain constant during those iterations. If the path gains $g_{ji}$ change during the iterations, the algorithm may fail to ever converge to a good set of transmit powers. In typical mobile networks, however, coherence times—over which the path gain can be assumed constant—are typically only in the range of 7-20 OFDM symbols.

A "coherence time" is also sometimes referred to as a "coherence interval" or "fast-fading interval". It has the property that on average, the CSI substantially decorrelates from one coherence interval to the next.

It should be noted as well that power allocation is even more advantageous for improving SINR when it is combined with beamforming Beamforming, however, uses channel state information (CSI) that should be updated as often as the fast-fading coefficients change, or else outdated beamforming coefficients might cause intolerable levels of interference.

Because of long convergence times, there is a general belief that distributed power allocation algorithms, particularly those that use CSI for beamforming, are not feasible in cellular networks that serve mobile user populations that move at vehicular speeds. By "vehicular speeds", we mean the range of speeds typically assumed in the planning of mobile wireless networks that are meant to serve users while riding or driving in vehicles on public streets and highways, or riding in trains. By way of example and without limitation, such a range may be from 0 to 100 km per hour for road-based vehicles, and up to 200 km per hour or more for trains.

However, we have discovered that despite teachings to the contrary, a distributed transmit power optimization algorithm is feasible for use in a wireless network that serves vehicular users, at least if it is a TDD mobile wireless systems with large antenna arrays.

At first glance, it appears that the path gains $g_{ij}$ should change rapidly with time, i.e., on a fast-fading timescale. That is:

(1) We may assume for the present purpose that the same set of pilot sequences $v_k$, $k=1, \ldots, K$, is used in all cells. Even if different cells use different sets of pilot sequences, no more than n pilot sequences can be mutually orthogonal, where n is the length of a pilot sequence. The length n must be at least K, but if it is too large the pilot signals will consume too much overhead. Thus, even if different cells use different sets of pilot sequences, few if any pilot sequences from one set will be orthogonal to all pilot sequences of a different set. As a consequence, directed interference will persist, leading to a similar conclusion to that expressed below.

Assuming now that the same set of pilot sequences is used in all cells, the estimate of the channel vector $h_{lkl}$ will have the form:

$$\hat{h}_{lkl} = \sqrt{\beta_{lk1}} h_{lk1} + \sqrt{\beta_{lk2}} h_{lk2} + \ldots + \sqrt{\beta_{lkL}} h_{lkL} + \text{additive noise}$$

In other words this estimate is a linear combination of the desired channel vector with other channel vectors. These channel vectors change rapidly. Therefore the norm $\|\hat{h}_{lkl}\|$ used in Equation (4), above, for $w_{lkl}$ is also expected to change rapidly.

(2) The path gains are equivalent to the terms $\sqrt{\beta_{lkl}} h_{lkl} \cdot w_{kl}$, $\sqrt{\beta_{lkl}} h_{lkl} \cdot w_{jl}$, and $\sqrt{\beta_{mkl}} h_{mkl} \cdot w_{jm}$ discussed above. These terms depend on the channel vectors and would therefore be expected to change on a rapid timescale.

However, careful analysis has shown that when the number of base station antennas M is large, the arguments dictating that the path gains $g_{ij}$ should change on a fast-fading timescale are invalid. Specifically, Fernandes 2012, cited above, included an analysis of fading behavior in the limit of large M, under the further assumption that for each k, the channel vectors of the k-th terminals are quasi-orthogonal. The channel vectors of k-th users are, equivalently, the k-th columns of the matrices $G_{jl}$, wherein each matrix $G_{jl}$ expresses the channel coefficients between the base station of cell j and the respective terminals of cell l. Stated differently, the assumption is that if p and q are the k-th columns of different matrices $G_{jl}$, then $$\left(\frac{1}{M}\right)|p^{\dagger}q|^2 \approx 0.$$

We believe that such an assumption will generally be justified from the following considerations:

Under the assumption of independent Rayleigh fading, quasi-orthogonality follows by necessity. Even under line-of-sight propagation conditions, however, when independent Rayleigh fading cannot be assumed, the channel vectors can still be assumed to be quasi-orthogonal. That is, if the terminals are randomly located, then all that is required for asymptotic orthogonality is that for sufficiently large values of M, the typical angular spacing between any two terminals should exceed the angular Rayleigh resolution limit of the array of base station antennas. (As expressed in radians, the angular Rayleigh resolution limit is the wavelength divided by the linear extent of the array).

Those skilled in the art will understand that the assumption of asymptotic orthogonality might not hold if the base station antennas and terminals are in a tunnel or other such region that behaves as a wave guide having a finite number of normal modes, or if there is a so-called keyhole phenomenon, in which all radiation must pass through a small bundle of scatterers.

The analysis of Fernandes 2012 shows that for large M, $$\|h\hat{h}_{lkl}\|^2 \approx \rho_{k1}\beta_{lk1} + \rho_{k2}\beta_{lk2} + \ldots + \rho_{kL}\beta_{lkL} + \sigma^2/n, \quad (10)$$

where $\rho_{kj}$ is the pilot power used by the k-th mobile in the 1-cell, $\sigma^2$ is the variance of additive noise in the base station receiver, and n is the length of the pilot sequences. (As noted above, n should be at least K so that mutual orthogonality between pilot sequences can be provided within a given cell.) Hence, the estimated coefficients $\|\hat{h}_{lkl}\|$ depend only on slowly fading coefficients.

The same analysis shows further that as M becomes large, the term $\sqrt{\beta_{lkl}} h_{lkl} \cdot w_{kl}$, which corresponds to the path gain $g_{ij}$ of the preceding discussion, approaches $\beta_{lkl}/\|\hat{h}_{lkl}\|$, the terms $\sqrt{\beta_{lkl}} h_{lkl} \cdot w_{jl}$, $j \neq k$, approach zero, and the terms $\sqrt{\beta_{mkl}} h_{mkl} \cdot w_{km}$ approach $\beta_{mkl}/\|\hat{h}_{mkl}\|$. Hence, taking into account the above limiting expression for $\|\hat{h}_{lkl}\|^2$, it will be seen that for large M, the above terms depend only on slow fading coefficients $\beta_{mjl}$ and on the pilot powers $\rho_{kj}$. As a consequence, for fixed transmit powers, the SINRs will depend only on the slow fading coefficients.

One conclusion to be drawn from the preceding observations is that in networks where M is very large, it is feasible to use a distributed power allocation algorithm.

Figure 4:
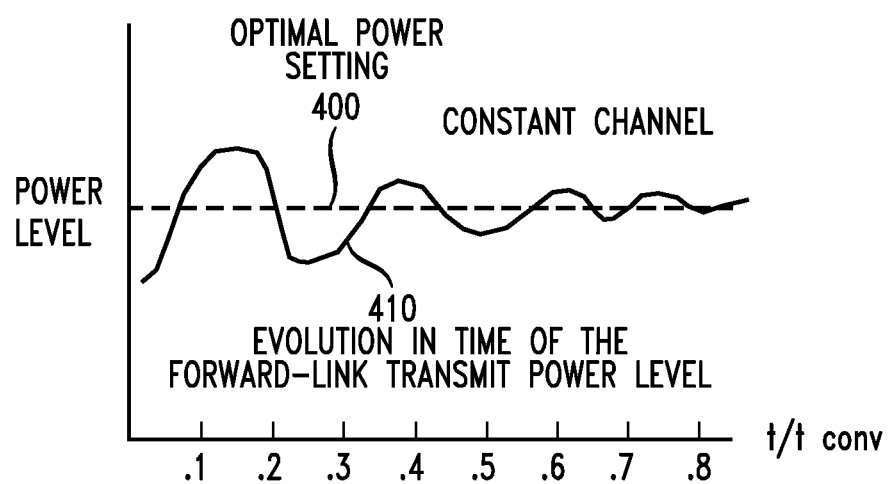
FIGS. 4-6 conceptually illustrate the convergence behavior of a power-allocation algorithm under different assumptions regarding the dynamics of the propagation channel.
Figure 5:
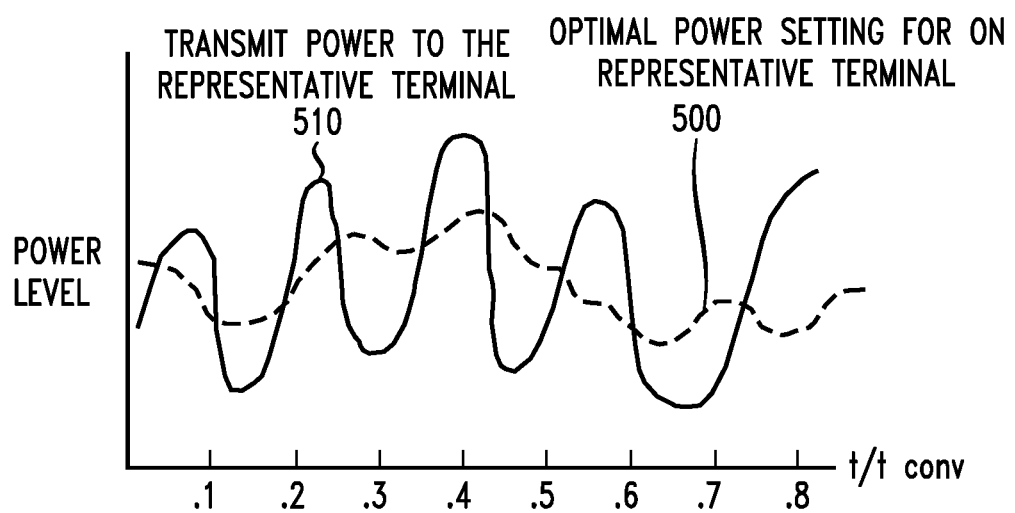
Figure 6:
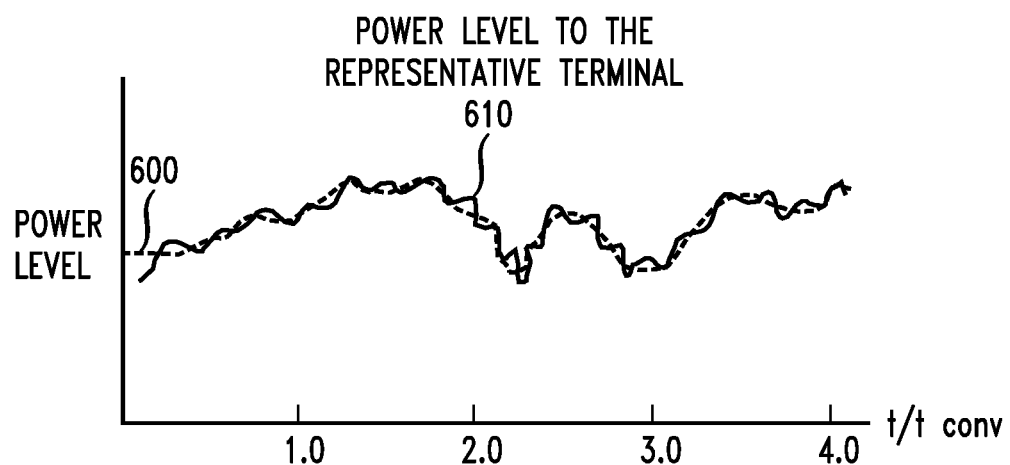

The convergence behavior of the power-allocation algorithm in a time-dependent propagation channel is more easily understood with reference to FIGS. 4-6, which are provided for pedogogic reasons and are notional and not meant to accurately portray real network behavior. Thus, for example, horizontal line 400 of FIG. 4 represents an optimal power setting for one representative terminal when all channel coefficients are static. Curve 410 represents the evolution in time of the forward-link transmit power level to the representative terminal. As seen in the figure, the power-level state adapts to the static channel over time, as the power-allocation algorithm is iterated.

More specifically, the power-level state is typically expected to oscillate for a period of time, as seen in the figure, until it is substantially converged to a near-optimal value. By "substantially converged" we mean that an asymptotic value can be discerned, and that changes in the power level from one iteration to the next are small relative to the asymptotic value. The asymptotic values for the respective terminals are "near-optimal" if collectively, they provide an acceptable level of SINR performance for the cell.

We refer to the time interval that elapses from the initial power-level state to a substantially converged state as the power-level adaptation time $t_{conv}$. If the SINR feedback information changed substantially between each fast-fading interval and the next, the power-allocation algorithm would not be able to converge (and in a dynamic situation, to track the evolution of the propagation channel), because at most only a few iterations can be performed within each fast-fading interval in typical mobile networks.

This situation is illustrated in FIG. 5, where curve 500 represents an optimal power setting for one representative terminal, assuming that the CSI is changing on a fast-fading timescale, and that the SINR feedback information from the terminals is changing on the same timescale. In the same figure, curve 510 represents the transmit power to the representative terminal as it evolves in time. As each change in the CSI effectively presents a new set of initial conditions relative to the power-level state, and as these changes occur often relative to an adaptation time, the power-level state is unable to converge and therefore undergoes relatively large oscillations that are unable to track the evolution of the propagation channel.

By contrast, FIG. 6 represents the situation in which the SINR feedback information depends only on the slow-fading coefficients, which change only slowly relative to an adaptation time. Here, it will be seen that as the channel evolves, the power level to the representative terminal, represented by curve 610, remains substantially converged and is able to track the optimal power level represented by curve 600.

Illustratively, each iteration of an exemplary power-allocation algorithm requires a duration of several OFDM symbols for each terminal to measure its SINR, a further OFDM symbol to return its SINR measurement to its base station, and a small additional amount of time for the base stations to adjust their transmit power levels (as well as to compute and apply the beamforming coefficients, if used). Let us assume for illustrative purposes that a coherence interval is 16 OFDM symbols, and that within such an interval, 8 OFDM symbols are used for uplink pilot transmission. It will be understood from the above considerations that the remaining 8 OFDM symbols can support, at best, only two or three iterations, which is only a small fraction of the total time needed for convergence. Therefore, convergence can be achieved, if at all, only over many coherence intervals. Our analysis shows that this is feasible because contrary to what is conventionally expected, the SINRs in a network having large-scale antenna arrays change only as fast as the slow-fading coefficients. Because the convergence of the algorithm depends only on the SINRs and not directly on the CSI, the algorithm has sufficient time to adapt to the evolution of the propagation channel.

The dependence of the SINRs on the slow-fading coefficients to the exclusion (in the limit of large M) of the fast-fading coefficients has an additional, salutary effect. The slow-fading coefficients are only weakly dependent on frequency, at least over the spectral range typically used for OFDM tones. As a consequence, it is sufficient if the SINR is measured on only one, or at most on a selected few, OFDM tones. The effect of this is to minimize the amount of time needed to make the SINR measurements, and thus to minimize the amount of time needed per iteration of the algorithm. By contrast, if WA, the SINRs will depend on the fast-fading coefficients, and hence they will need to be measured over many, possibly over hundreds, of OFDM tones. This may extend the time per iteration to hundreds of OFDM symbols, further defeating the possibility that the algorithm might converge within a coherence interval.

By way of example, one algorithm that is useful in this regard is described in M. Rasti and A. Sharafat, "Distributed uplink power control with soft removal for wireless networks," *IEEE Trans. on Communications*, vol. 59 (2011) 833-843 (Rasti 2011). We will now describe an adaptation of the Rasti 2011 algorithm for forward-link power allocation in TDD wireless systems.

Algorithm for Distributed Power Allocation in TDD Wireless Systems:

1. Set target SINR values $S_{kl,target}$, k=1, ..., K; l=1, ..., L for all terminals in all cells.
2. Set the maximum permitted transmit powers $\overline{P}_{kl}$, k=1, ..., K; l=1, ..., L.
3. Begin transmitting with equal transmit powers $P_{kl}=P$, k=1, ..., K; l=1, ..., L.
4. For t from 1 to N, perform steps 5-7:
5. Each terminal estimates its current SINR value $S_{kl}(t)$, k=1, ..., K; l=1, ..., L and transmits it back to its own base station.
6. For all l, l=1, ..., L, base station l computes $R_{kl}(t)=P_{kl}(t-1)/S_{kl}(t)$, k=1, ..., K.
7. For all l, l=1, ..., L, if $R_{kl}(t)<\overline{P}_{kl}/S_{kl,target}$ then base station l sets up power $P_{kl}(t)=R_{kl}(t)S_{kl,target}$, otherwise it sets up power $$P_{kl}(t) = \frac{\overline{P}_{kl}^2}{R_{kl}(t)S_{kl,target}}.$$

Figure 7:
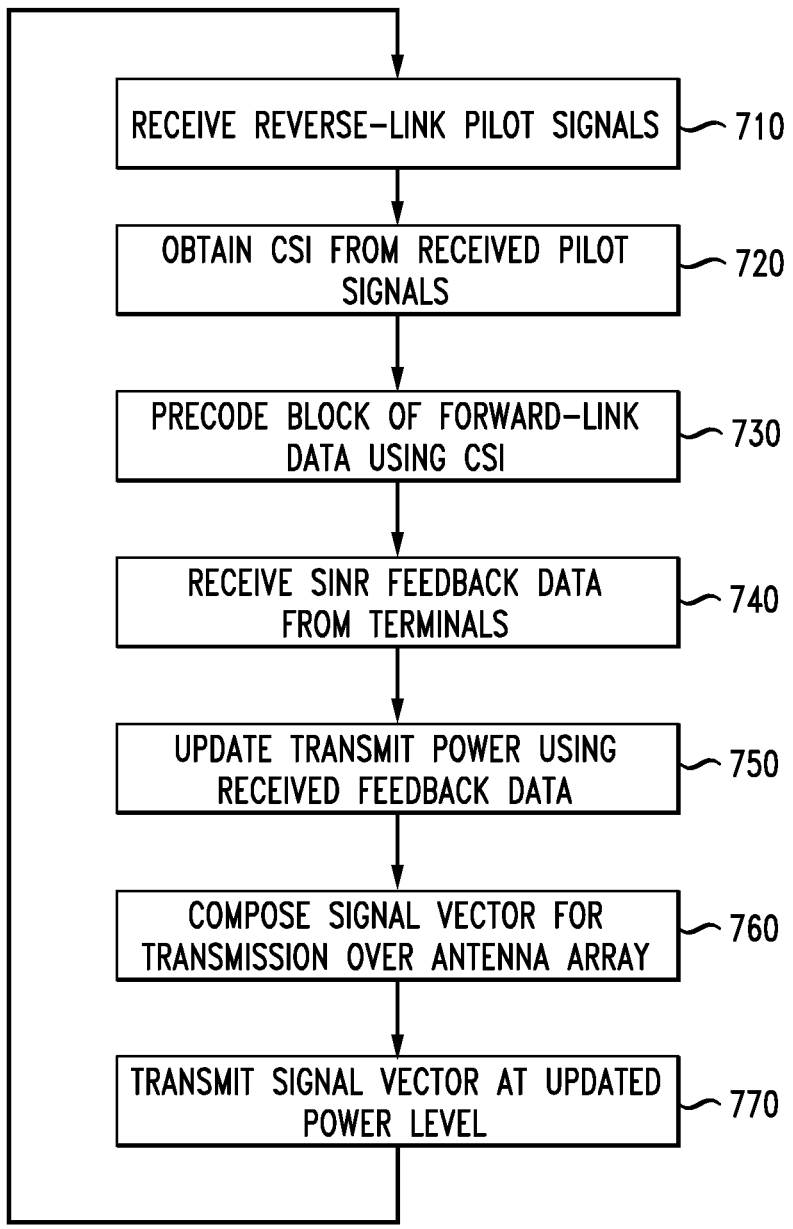
FIG. 7 is a flowchart illustrating the processing of forward-link signals by a base station, according to an embodiment of the invention.

Accordingly, FIG. 7 provides one example of a modified power-allocation algorithm in accordance with an embodiment of our invention. As seen in the figure, blocks 710 and 720 represent the obtaining of CSI from pilot signals that the base station receives on the reverse link from the terminals that it serves. These pilot signals are typically transmitted concurrently by all the terminals within a given cell, and the pilot signal transmissions may also be concurrent from cell to cell within a network of cells. It should be noted that block 710 ("receive reverse-link pilot signals") and 720 ("obtain CSI from received pilot signals") are not necessarily performed in each iteration, because it may be possible to iterate the algorithm several times within the span of one coherence interval of the propagation channel. Instead, therefore, blocks 710 and 720 may be repeated periodically, but with a repetition frequency that is less than the frequency with which steps 730-770 are iterated.

It should be noted in this regard that in typical mobile networks, we expect that the adaptation time for the power levels to the terminals will often span thirty or more CSI-update periods, due to the speed at which the CSI is evolving.

Turning now to FIG. 7, the base station receives the reverse-link pilot signals at block 710 and obtains the CSI from the pilot signals at block 720. As is well known to those skilled in the art, a typical base station is functionally divided into a radiofrequency (RF) processing portion and a baseband processing portion, among other things. Modules for receiving the pilot signals over the air interface and demodulating them to baseband will typically reside in the RF processing portion. Modules for obtaining the CSI and storing it for further use will typically reside in the baseband processing portion.

At block 730, a block of data to be transmitted on the forward link is precoded for beamforming, using the CSI to compute the beamforming coefficients. A module for performing the precoding will typically reside in the baseband processing portion of the base station.

At block 740, the base station receives SINR feedback data in reverse-link transmissions from the terminals. Modules for receiving the feedback data over the air interface and demodulating it to baseband will typically reside in the RF processing portion of the base station. Modules for obtaining the feedback data and storing it for further use will typically reside in the baseband processing portion.

At block 750, the base station uses the SINR feedback data to update the allocations of forward-link power to the respective terminals. A module for performing this function will typically reside in the baseband processing portion of the base station, and in particular, it may be part of the scheduler functionality.

At block 760, the base station composes the signal vector for transmission. The signal vector includes a respective component for transmission from each antenna of the base station antenna array. A module for the initial composition of the signal vector, i.e. at baseband, will typically reside in the baseband processing portion of the base station.

At block 770, the signal vector is transmitted from the antenna array at the updated set of transmit-power levels. Modules for the RF modulation of the signal vector and for conditioning it for transmission will typically reside in the RF processing portion of the base station.

Figure 8:
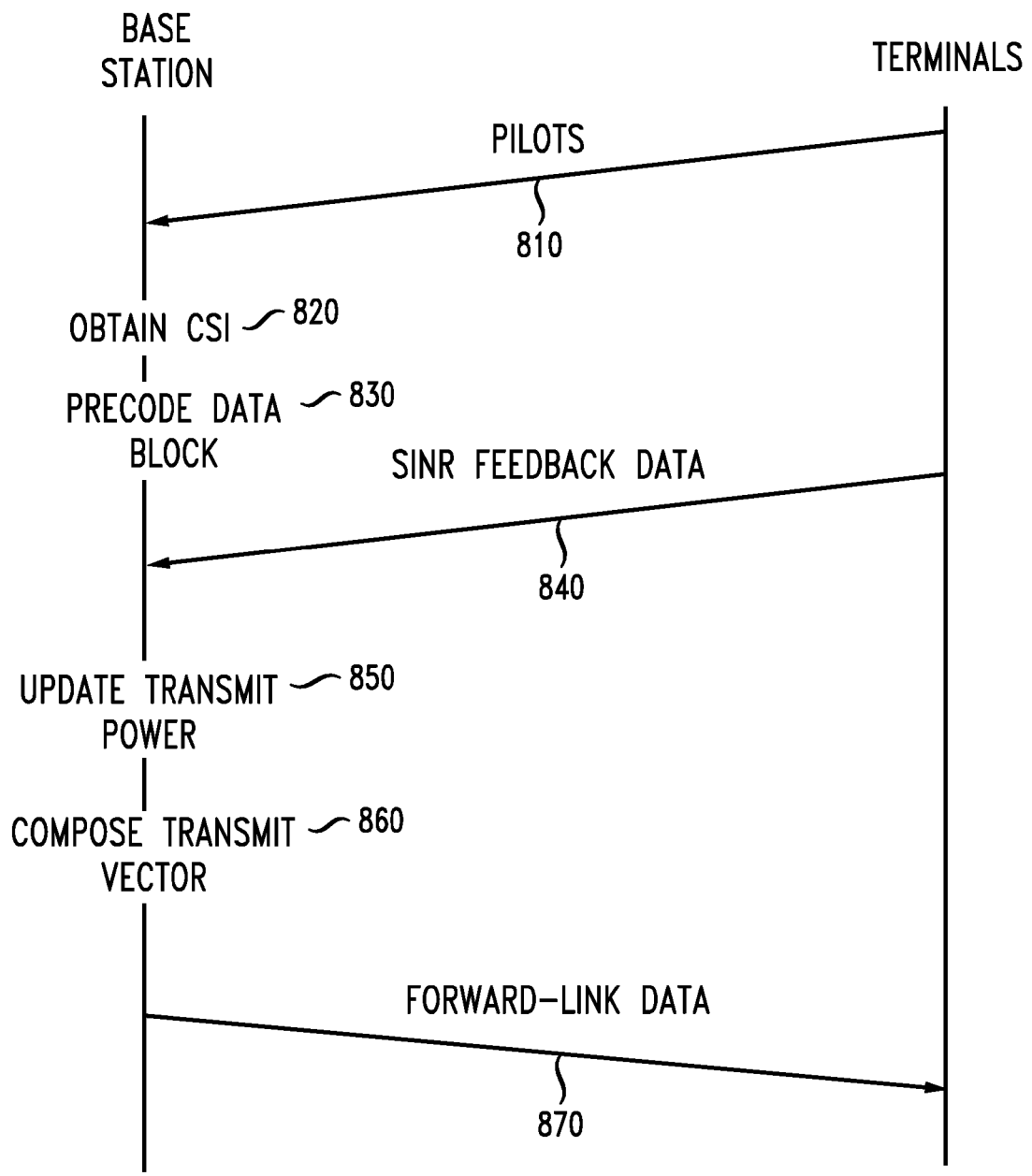
FIG. 8 is a timing diagram which provides one possible example of an exchange of information which supports the signal processing technique of FIG. 7.

FIG. 8 provides one possible example of the timing of forward-link and reverse-link signal transmissions, and related signal processing, that support the algorithm of FIG. 7. As seen in the figure, at 810 the reverse-link pilot signals are transmitted, at 820 the CSI is obtained, and 830 the next block of forward-link data is precoded, and at 840 the SINR feedback data is transmitted. At 850 the allocation of forward-link transmit power is updated, at 860 the new signal vector for transmission is composed, and at 870 the new forward-link signal is transmitted. It will be understood that the algorithm of FIG. 7 and the timing diagram of FIG. 8 are merely illustrative, and not meant to exclude any of many other alternative realizations of the general approach described here.

Figure 9:
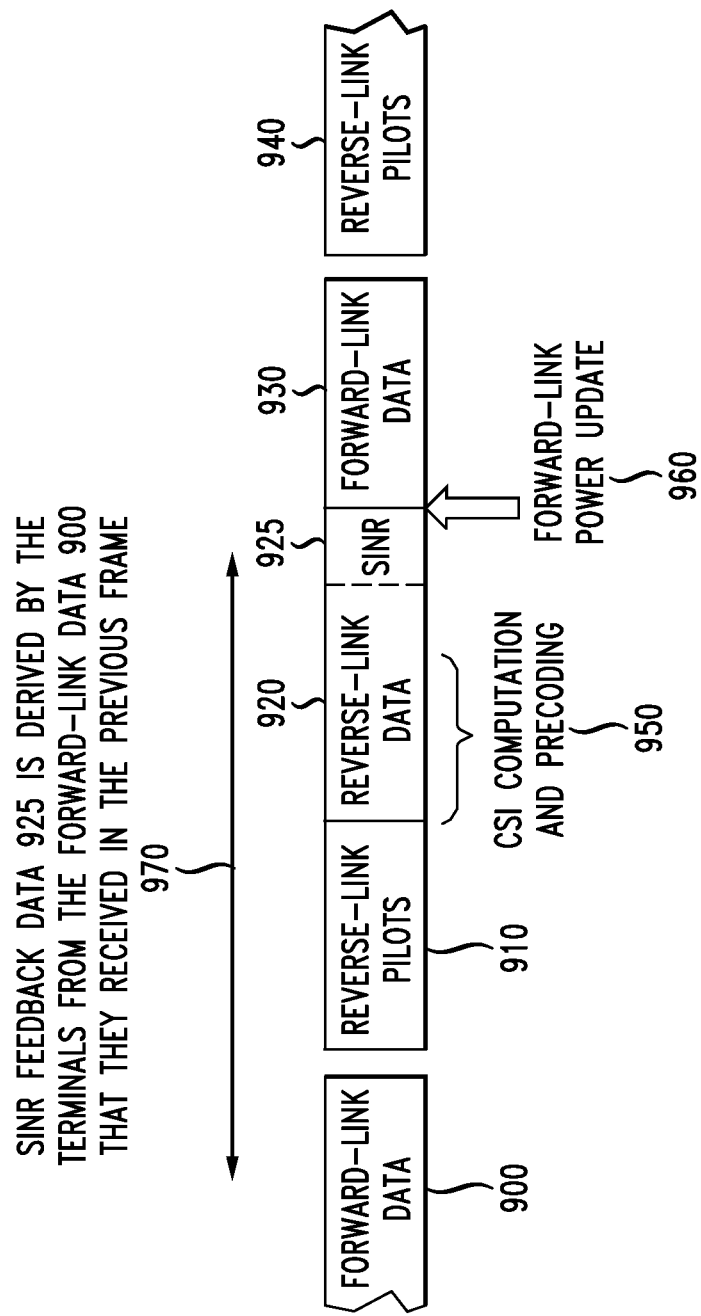
FIG. 9 provides one example of a possible frame format for wireless communication in accordance with an embodiment of the invention.

FIG. 9 provides one possible example of a frame format that may be used for wireless communication in accordance with the principles described here. The example of FIG. 9 is merely illustrative, and not meant to exclude any of many other alternative realizations of the general approach described here. Turning to FIG. 9, it will be seen that the frame format includes field 910 for the transmission of the pilot signals on the reverse link, field 920 for the transmission of data on the reverse link, and field 930 for the transmission of data on the forward link. A portion 925 of field 920 is reserved for the transmission of the SINR feedback data from the terminals to the base station. As shown in the figure, the CSI may be computed and the block of forward-link data may be precoded during a time interval 950 which follows the receipt of the reverse-link pilot signals, and overlaps the time that the reverse-link data is being received. A terminal portion 900 of the previous frame is also shown in the figure, as is an initial portion 940 of the next frame. Arrow 970 indicates, symbolically, that the SINR feedback data 925 is derived by the terminals from the forward-link data 900 that they received in the previous frame.

Figure 10:
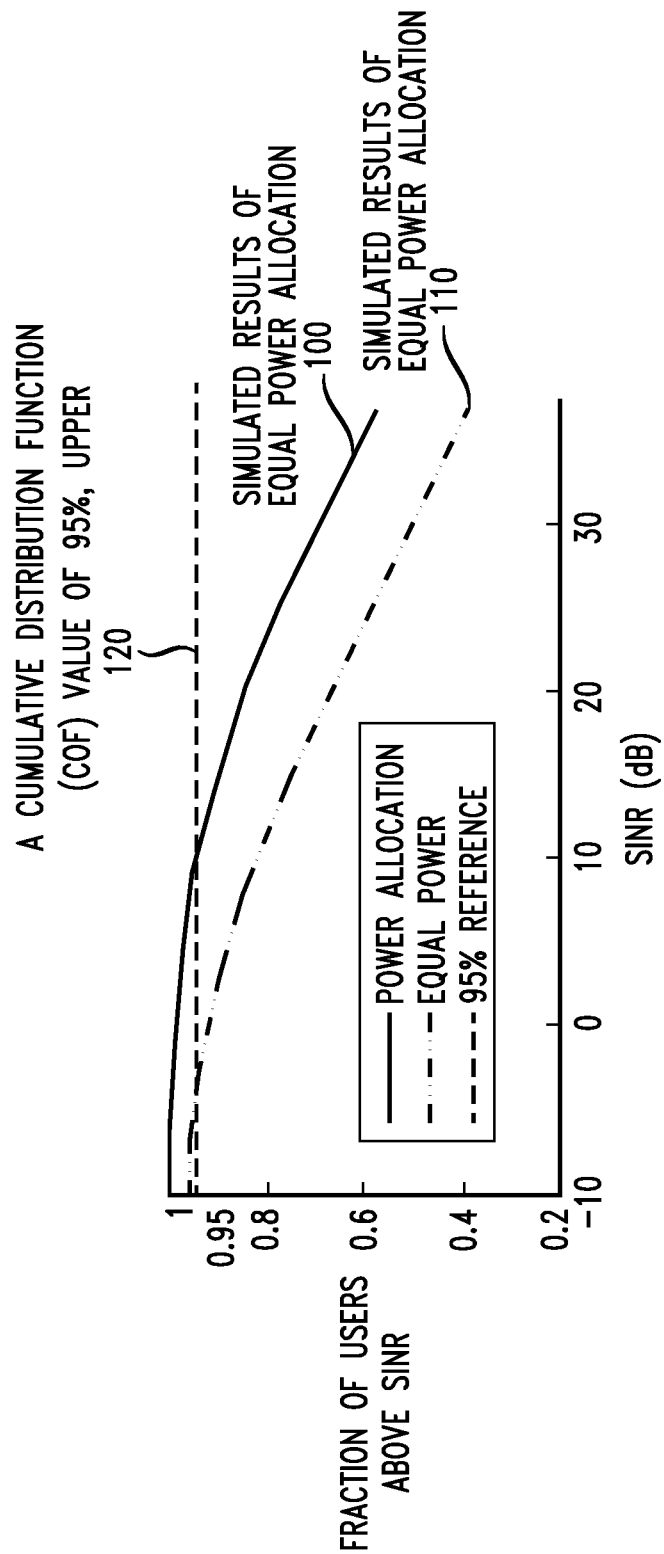
FIG. 10 is a plot illustrating the result of simulations in which an equal allocation of forward-link transmit power is contrasted with a power allocation that is optimized according to the present invention.

FIG. 10 illustrates the results of simulations that we performed, contrasting an equal allocation of forward-link transmit power with a power allocation that was optimized using the techniques described here.

Sixty iterations were used in the power optimization. The scenarios that we simulated were based on a cellular system organized in hexagonal cells with radius 1.6 km, with terminals uniformly distributed in each cell, but (as is standard practice in simulations of this kind) excluded from the interior of a circle of radius 100 m around each base station. OFDM modulation was assumed. The system used a frequency band of 20 MHz and a carrier frequency of 1.9 GHz.

We modeled the slow fading coefficients $\beta_{mjl}$ assuming an average decay of 38 dB/decade and log normal shadowing with a standard deviation of 8 dB. We assumed that the coherence interval, during which channel vectors (i.e., fast fading coefficients) $h_{kl}$ can be assumed constant is equal to the time interval occupied by nine OFDM symbols. We used pilot sequences of length n=4.

Turning now to FIG. 10, it will be seen that SINR is plotted on the horizontal axis (the abscissa), and on the vertical axis is plotted the fraction of terminals (referred to as "users" in the figure) that have SINR greater than or equal to the abscissa value. The upper (solid) curve 100 represents simulated results of our optimized power allocation, the lower (alternating dots and dashes) curve 110 represents the simulated results of equal power allocation, and the horizontal (dashed) line 120 is a reference line representing a cumulative distribution function (CDF) value of 95%.

In particular, using the reference line it will be seen that for equal allocation, 95% of terminals have SINR at least −5 dB, whereas for optimized allocation, 95% of terminals have SINR at least 10.7 dB. Thus, optimized allocation gains more than 15 dB of SINR. In terms of data transmission rates, this gain implies that 95% of terminals can be provided a rate of 0.27 Mbps with equal allocation, and a rate of 2.5 Mbps with optimized allocation. Optimized allocation is thus predicted to provide a ninefold increase in data transmission rates.

We claim:

1. A method of communication between a wireless base station and a population of one or more terminals, comprising:
   in each of a plurality of iterations, transmitting a block of forward-link data from an array of multiple base station antennas to the population of one or more terminals;
   in each of said iterations, updating a forward-link power level based on a convergence algorithm for each terminal based on SINR feedback data returned by the population of one or more terminals in response to the forward-link data transmitted in a previous iteration, wherein the forward-link power level substantially converges toward an asymptotic value as a result of the plurality of iterations;
   during said plurality of iterations, periodically updating a set of beamforming coefficients based on channel state information (CSI) obtained from reverse-link pilot signals, wherein the CSI is obtained once per a CSI-update period long enough that the CSI obtained in each period is decorrelated from the CSI obtained in a previous period; and
   precoding each data block prior to transmission with most recently updated beamforming coefficients, wherein:
   each data block is transmitted at most recently updated forward-link power levels; and
   the power levels are updated using local information.

2. The method of claim 1, wherein the beamforming coefficients are updated frequently enough to beamform to a mobile population of terminals traveling at vehicular velocities.

3. The method of claim 1, wherein the array comprises at least twenty base station antennas.

4. The method of claim 1, further comprising periodically receiving pilot signals concurrently transmitted from the terminals of the population of one or more terminals.

5. The method of claim 1, further comprising, in each iteration, receiving SINR feedback data from each terminal of the population of one or more terminals.

6. The method of claim 5, wherein the SINR feedback data comprises information derived from an indication of useful signal power ($P_{sig}$) and an indication of interference power ($P_{int}$) of each terminal of the population of one or more terminals.

7. The method of claim 1, performed concurrently with a plurality of other base stations.

8. The method of claim 1, wherein:
the forward-link power levels have an adaptation time within which the forward-link power levels substantially reach an asymptotic value for static CSI; and
the adaptation time is at least thirty CSI-update periods.

9. The method of claim 1, wherein the precoding of the data block creates a transmit signal vector that is distributed across the antennas of the array.

10. A wireless base station for communication with a population of one or more terminals, comprising:
a module configured to transmit, in each of a plurality of iterations, a block of forward-link data from an array of multiple base station antennas to the population of one or more terminals;
a module configured to update, in each of said iterations, a forward-link power level based on a convergence algorithm for each terminal based on SINR feedback data returned by the population of one or more terminals in response to the forward-link data transmitted in a previous iteration, wherein the forward-link power level substantially converges toward an asymptotic value as a result of the plurality of iterations;
a module configured to periodically update, during said plurality of iterations, a set of beamforming coefficients based on channel state information (CSI) obtained from reverse-link pilot signals, wherein the CSI is obtained once per a CSI-update period long enough that the CSI obtained in each period is decorrelated from the CSI obtained in a previous period; and
a module configured to precode each said data block, prior to transmission, with most recently updated beamforming coefficients, wherein:
the transmission module is configured to transmit each said data block at most recently updated forward-link power levels; and
the power-level updating module is configured to update the power levels using local information.

11. The base station of claim 10, configured to update the beamforming coefficients frequently enough to beamform to a mobile population of terminals traveling at vehicular velocities.

12. The base station of claim 10, wherein the array comprises at least twenty base station antennas.

13. The base station of claim 10, further comprising a module configured to periodically receive pilot signals concurrently transmitted from the terminals of the population of one or more terminals.

14. The base station of claim 10, further comprising a module configured to receive, in each iteration, SINR feedback data from each terminal of the population of one or more terminals.

15. The base station of claim 10, wherein the precoding of the data block creates a transmit signal vector, and the base station is configured to distribute said vector across the antennas of the array.

* * * * *